United States Patent
Farrugia et al.

(10) Patent No.: US 8,835,589 B2
(45) Date of Patent: Sep. 16, 2014

(54) SYNTHESIS OF ABIETIC ACID-BASED MACROMER FOR POLYESTER RESIN PROCESS

(75) Inventors: Valerie M. Farrugia, Oakville (CA); Guerino G. Sacripante, Oakville (CA); Ke Zhou, Oakville (CA)

(73) Assignee: Xerox Corporation, Norwalk, CT (US)

( * ) Notice: Subject to any disclaimer, the term of this patent is extended or adjusted under 35 U.S.C. 154(b) by 24 days.

(21) Appl. No.: 13/359,034

(22) Filed: Jan. 26, 2012

(65) Prior Publication Data
US 2013/0196262 A1 Aug. 1, 2013

(51) Int. Cl.
*C09F 1/04* (2006.01)
*G03G 9/087* (2006.01)

(52) U.S. Cl.
USPC ............................. 527/604; 430/137.15

(58) Field of Classification Search
USPC ............................. 527/604; 430/137.15
See application file for complete search history.

(56) References Cited

U.S. PATENT DOCUMENTS

| | | | | |
|---|---|---|---|---|
| 1,998,744 | A * | 4/1935 | Ubben | 524/386 |
| 2006/0235121 | A1 * | 10/2006 | Burch | 524/270 |
| 2009/0047593 | A1 * | 2/2009 | Vanbesien et al. | 430/110.2 |
| 2009/0142689 | A1 * | 6/2009 | Sacripante et al. | 430/113 |
| 2010/0205853 | A1 * | 8/2010 | Rao et al. | 44/388 |

FOREIGN PATENT DOCUMENTS

| | | |
|---|---|---|
| CA | 2 744 125 A1 | 12/2011 |
| GB | 1 442 835 | 1/1976 |

OTHER PUBLICATIONS

Halbrook et al., "The Isolation of Dehydroabietic Acid from Disproportionated Rosin," Notes, vol. 31, pp. 4246-4247, 1966.
Rao et al., "Synthesis and Antitumor Activity of Novel α-Aminophosphonates from Diterpenic Dehydroabietylamine," Heteroatom Chemistry, vol. 19, No. 5, pp. 512-516, 2008.
Rao et al., "Synthesis, Structure Analysis and Cytotoxicity Studies of Novel Unsymmetrically N,N'-Substituted Ureas from Dehydroabietic Acid," Chem. Pharm. Bull., vol. 56, No. 11, pp. 1575-1578, 2008.
Sepúlveda et al., "Gastroprotective and Cyctotoxic Effect of Dehydroabietic Acid Derivatives," Pharmacological Research, vol. 52, pp. 429-437, 2005.
Wada et al., "Antiulcer Activity of Dehydroabietic Acid Derivatives," Chem. Pharm. Bull., vol. 33, No. 4, pp. 1472-1487, 1985.
Lockwood, "Chapter 11: Production of Organic Acids by Fermentation," In Microbial Technology, $2^{nd}$ Ed., vol. I, Peppier, H. J. and Perlman, D. Eds., Academic Press: New York, pp. 356-387, 1979.
Taylor et al., "Fatty and Resin Acid Analysis in Tall Oil Products via Supercritical Fluid Extraction-Supercritical Fluid Reaction Using Enzymatic Catalysis," Journal of Chromatographic Science, vol. 39, pp. 269-272, 2001.
http://www.cyberlipid.org/cyberlip/oxid0001.htm, "Lipid Peroxidation," Feb. 26, 2010.
Nov. 21, 2013 Office Action issued in Canadian Patent Application No. 2,803,238.

* cited by examiner

*Primary Examiner* — Hoa V Le
(74) *Attorney, Agent, or Firm* — Pillsbury Winthrop Shaw Pittman LLP

(57) ABSTRACT

An improved polycondensation method for bio-based polyesters synthesized from pre-formed macromers and the corresponding compositions, which are useful for producing binder polymers for imaging applications such as emulsion-aggregation (EA) toner.

15 Claims, No Drawings

SYNTHESIS OF ABIETIC ACID-BASED MACROMER FOR POLYESTER RESIN PROCESS

TECHNICAL FIELD

This disclosure is directed to bio-based polyester resins that may be used to produce emulsion aggregation toners, methods for making the bio-based polyester resins, and emulsion aggregation toners comprising the bio-based polyester resins.

BACKGROUND

Emulsion aggregation (EA) toners are used in forming print and/or xerographic images. Emulsion aggregation techniques typically involve the formation of an emulsion latex of resin particles that have a small size of from, for example, about 5 to about 500 nanometers in diameter, by heating the resin, optionally with solvent if needed, in water, or by making a latex in water using an emulsion polymerization. An optional colorant dispersion, for example of a pigment dispersed in water, optionally with additional resin, is separately formed. The colorant dispersion is added to the emulsion latex mixture, and an aggregating agent or complexing agent is then added and/or aggregation is otherwise initiated to form aggregated toner particles. The aggregated toner particles are heated to enable coalescence/fusing, thereby achieving aggregated, fused toner particles.

SUMMARY

Energy and environmental policies, increasing and volatile oil prices, and public/political awareness of the rapid depletion of global fossil reserves has created a need to find sustainable monomers derived from biomaterials. By using bio-renewable feedstock, manufacturers may reduce their carbon footprint and move to a zero-carbon or even a carbon-neutral footprint. Bio-based polymers are also very attractive in terms of specific energy and emission savings. Utilizing bio-based feedstock can decrease the amount of plastic targeted for landfills, help provide new sources of income for domestic agriculture, and reduce the economic risks and uncertainty associated with reliance on petroleum imported from unstable regions.

Also, many current polyester-based toners are derived from Bisphenol A monomer. Bisphenol A has been identified as a carcinogen and an endocrine disrupter that causes adverse developmental health effects. Several European countries, Canada, and several U.S. states are targeting the ban of Bisphenol A.

Disclosed herein are an improved polycondensation method for bio-based ("green") polyesters synthesized from pre-formed macromers and the corresponding compositions, which are useful for producing binder polymers for imaging applications such as emulsion-aggregation (EA) toner.

EMBODIMENTS

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

The term "bio-based" refers, for example, to products made from biological raw materials obtained from or produced by living organisms such as, for example, plants, trees, algae, bacteria, yeast, fungi, protozoa, insects, and animals that are renewable raw materials. Bio-based products often serve as substitutes for fossil-based products, and are typically neutral in terms of greenhouse gas and leave a smaller ecological footprint, i.e. generate less waste, and use less energy and water. Bio-based products usually consume less natural resources during their production thereby lowering cost and are, thus, better for the environment.

Resins and Polymers

The bio-based polyesters may be obtained by a two-step process. In the first step, a macromer is formed by the esterification between a resin acid, such as abietic acid and dehydroabietic acid, and a bio-based polyol such as glycerol. In the second step, the macromer formed in first step is polycondensed with at least one diacid to form the final polyester product that may be used as a binder in imaging materials such as EA toner.

The abietic acid used to form the macromer may be supplied as an impure compound (about 70% purity) and may be used without further purification. Dehydroabietic acid is an abietane diterpenic resin acid which can be easily obtained from Pinus resin or commercial disproportionate rosin, such as by the method disclosed by Halbrook et al., J. Org. Chem., 31:4246-4247 (1966), the disclosure of which is herein incorporated by reference in its entirety. Dehydroabietic acid is also widely used as starting material for design and synthesis of biological compounds, as described by Rao et al., Heteroat. Chem., 19:512-516 (2008); Rao et al., Chem. Pharm. Bull., 56:1575-1578 (2008); Sepulveda et al., Pharmacol. Res., 52:429-437 (2005); and Wada et al., Chem. Pharm. Bull. (Tokyo), 33:1472-1487 (1985), the disclosures of which are incorporate herein by references in their entireties. Other suitable resin acids include abietic-type acids such as neoabietic acid, dehydroabietic acid, palustric acid, and levopimaric acid.

Glycerol or glycerine is a waste product of biodiesel production obtained from triglycerides, i.e., the transesterification of crude vegetable oil. Other suitable bio-based polyols include adonitol, arabitol, sorbitol, mannitol, galactitol, isomalt, inositol, lactitol, xylitol, maltitol, 1-methyl-glucopyranoside, 1-methyl-galactopyranoside, 1-methyl-mannopyranoside, erythritol, diglycerol, polyglycerol, sucrose, glucose, amylose, nystose, kestose, trehalose, raffinose, and gentianose.

Pre-forming the abietic acid-glycerol macromer in the first step ensures the full reaction of main bio-based component of resin. The macromer synthesis can be tracked by nuclear magnetic resonance (NMR) to ensure formation, at which point the remaining monomers can be added to form the final polymer product. On the other hand, when all the required monomers are added up front (bulk addition) instead of using a macromer formation step, more side reactions occur resulting in a darker resin color and early termination of polymer chain occurs, resulting in very low molecular weights. The reaction time is much longer with bulk addition of monomers and the resultant composition and its properties are unpredictable. The reaction time of the two-step polymerization reaction can be performed in about half the time required for bulk addition processes, and no vacuum distillation is required to synthesize the bio-resin.

Thus, the macromer process provides greater control over the polymerization process and synthesizing the macromer in bulk can provide the starting bio-monomer for many different formulations by varying the second step monomers. Also, the resins produced from the two-step process exhibit higher C/O ratios than those produced from bulk addition processes and there is no acid functionality requirement via citric acid or trimellitic anhydride addition. The resins produced from the two-step process may exhibit a C/O ratio in the range of from about 5.5 to about 10.0, such as from about 6.0 to about 9.0, or from about 7.0 to about 8.0. The C/O ratio may be greater than about 5.5, or about 6.0, or about 6.5, or about 7.0, or about 7.5, or about 8.0.

The reaction scheme below highlights the first step of one embodiment of the disclosed two-step process, which is the formation of the abietic acid-glycerol macromer.

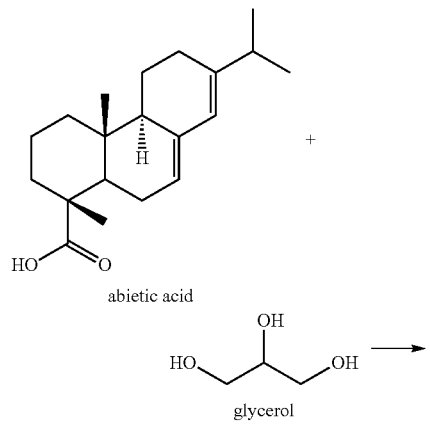

-continued

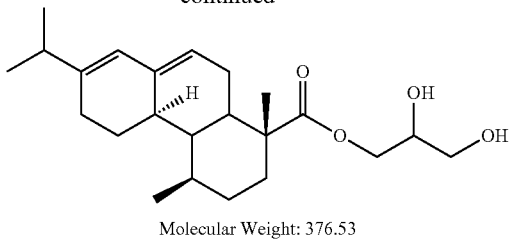

Molecular Weight: 376.53

NMR may be used to monitor the formation of the ester bond between abietic acid and glycerol. Both proton and carbon NMR spectrums show specific peak shifting. For example, in this reaction when the acid of abietic acid and the hydroxyl of glycerol react to make an ester bond, a shift is seen in the $^{13}C$ NMR of the carbonyl group from abietic acid.

Step 2 is shown below, where the macromer synthesized in step 1 is further reacted with two diacids, sebacic acid and isophthalic acid:

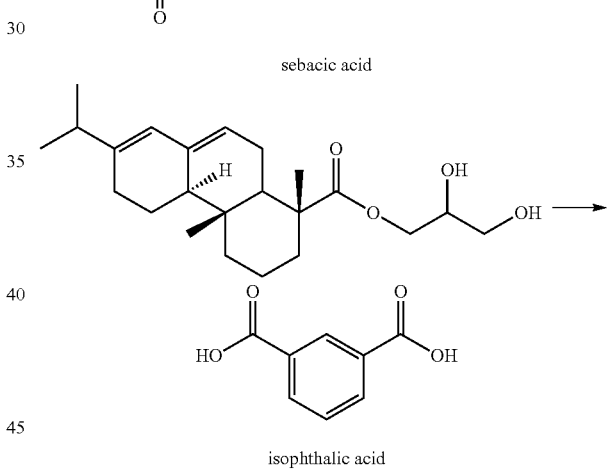

to form the polymer of interest (polymer fragment shown):

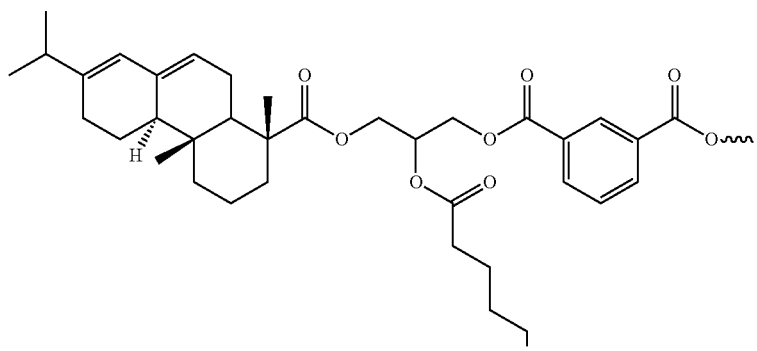

-continued

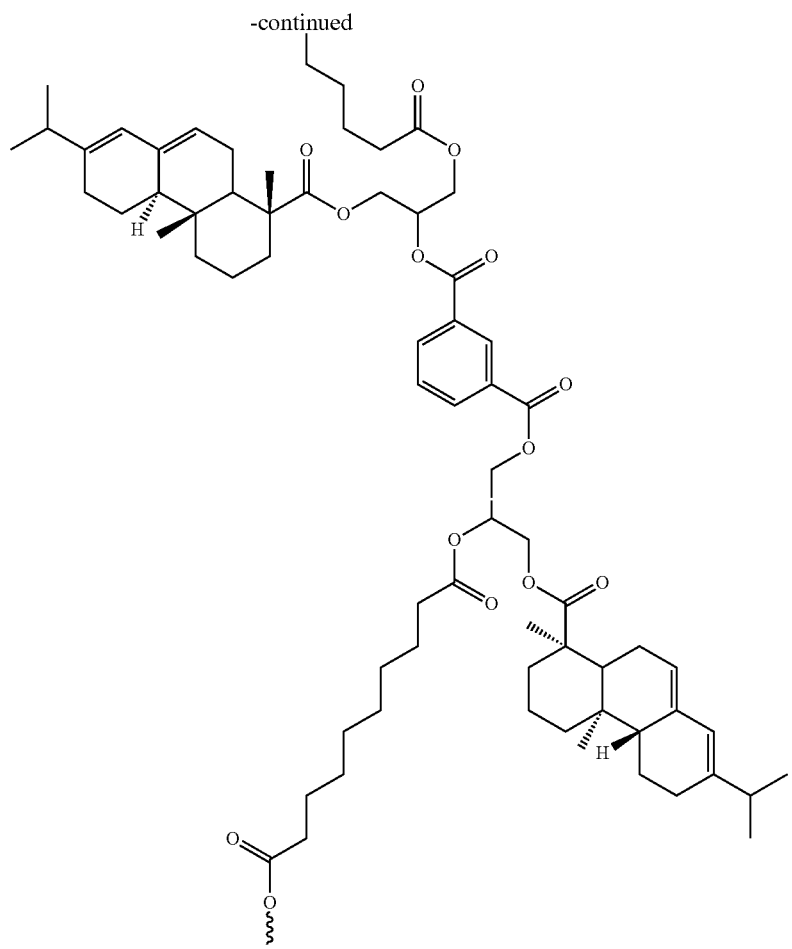

Sebacic acid is also a bio-based monomer derived from castor oil, while isophthalic acid is synthetically made by oxidizing meta-xylene using oxygen.

The resin-based macromer may be 100 mol % bio-based and may be present in an amount to provide greater than about 80 mol % biomass content to the polyester formulations, resulting in a polyester that is at least 80 mol % bio-based, such as at least 85 mol %, 90 mol %, or 95 mol %. Of course, polyesters may also be formulated having a biomass content of less than 80 mol %, such as at least 70 mol %, 60 mol %, or 50 mol %, or even lower.

The polyester may be 100 mol % bio-based if isophthalic acid is replaced with a bio-based aromatic monomer or a linear bio-based diacid such as succinic acid. Succinic acid has the following structure:

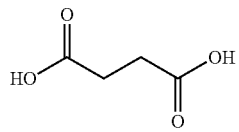

and may be produced by a bio-route together with oxalic acid, fumaric acid, and malic acid in submerged culture anaerobic fermentation by various types of bacteria and molds. This production process is described by Lockwood, L. B., "Production of Organic Acids by Fermentation," In Microbial Technology, Peppier, H. J. and Perlman, D. Eds., Academic Press: New York, pp. 356-387 (1979), the entire disclosure of which is incorporated by reference herein.

Other suitable diacids include adipic acid, azelaic acid, and glutaric acid. Azelaic acid is produced by a chemical synthesis pathway from oleic acid. Oleic acid is a monosaturated 18-carbon fatty acid that is found in most animal fats and vegetable oils. Azelaic acid may be produced by oxidative cleavage of oleic acid with chromic acid or by Ozonolysis. Ozonolysis is disclosed in Cyberlipid, 2009 at www.cyberlipid.org/cyberlip/home0001.htm, the entire disclosure of which is incorporated by reference herein. Azelaic acid has the following structure:

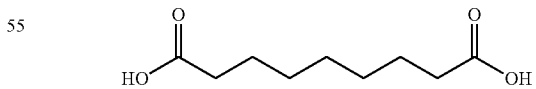

In the step of polycondensing the abietic acid-based macromer with the diacids, the macromer may be present in an amount of, for example, from about 5 to about 95 mol % of the polyester resin, such as from about 5 to about 80 mol %, from about 10 to about 70 mol %; from about 20 to about 60 mol %; or from about 40 to about 60 mol % of the polyester resin. The total amount of diacid may be selected in an amount of, for example, from about 5 to about 95 mol %, such as from about 5 to about 80 mol %, from about 10 to about 70 mol %; from about 20 to about 60 mol %; or from about 40 to about 60 mol % of the polyester resin.

Polycondensation catalysts include tetraalkyl titanates such as titanium (iv) butoxide or titanium (iv) iso-propoxide; dialkyltin oxides such as dibutyltin oxide; tetraalkyltins such as dibutyltin dilaurate; dialkyltin oxide hydroxides such as butyltin oxide hydroxide; aluminum alkoxides; alkyl zinc; dialkyl zinc; zinc oxide; stannous oxide; and combinations thereof. The catalysts may be used in amounts of, for example, from about 0.001 mol % to about 0.55 mol %, or from about 0.001 mol % to about 0.30 mol %, or from about 0.25 mol % to about 0.55 mol % based on the starting diacid or diester used to generate the polyester resin.

The polyester resin may be present, for example, in an amount of from about 5 to about 50 wt % of the toner components, such as, for example, from about 5 to about 25 wt %, from about 10 to about 35 wt %, from about 30 to about 40 wt %, or from about 25 to about 50 wt % of the toner components. The polyester resin may have a number average molecular weight ($M_n$), as measured by gel permeation chromatography (GPC) of, for example, from about 1,000 to about 50,000, such as from about 2,000 to about 25,000, or from about 10,000 to about 20,000, and a weight average molecular weight ($M_w$) of, for example, from about 2,000 to about 100,000, such as from about 3,000 to about 30,000, or from about 5,000 to about 25,000 as determined by GPC using polystyrene standards. The molecular weight distribution ($M_w/M_n$) of the polyester resin may be, for example, from about 1 to about 15, such as from about 1.5 to about 10, or from about 3 to about 8, or from about 2 to about 3.5.

The polyester resin may have a glass transition temperature (Tg) of, for example, from about 30° C. to about 120° C., such as from about 40° C. to about 90° C., or from about 45° C. to about 75° C.

The polyester resin may have a softening point (Ts) of, for example, from about 90° C. to about 150° C., such as from about 95° C. to about 135° C., or from about 100° C. to about 120° C. Different softening points may produce toners exhibiting different gloss levels. For example, in some embodiments, resins having a softening point of 101° C. to 103° C. produce toners having a higher gloss than toners produced with resins having a softening point of 105° C. or higher.

The polyester resin may have an acid value from about 2 to about 30 mgKOH/g, such as from about 8 to about 16 mgKOH/g, or from about 10 to about 14 mgKOH/g. The acid value (or "neutralization number" or "acid number" or "acidity") may be measured by dissolving a known amount of polymer sample in an organic solvent and titrating with a solution of potassium hydroxide (KOH) with known concentration and with phenolphthalein as a color indicator. The acid number is the mass of potassium hydroxide in milligrams that is required to neutralize one gram of chemical substance. For the polyester resins, the acid number is the measure of the amount of carboxylic acid groups in a polyester molecule.

Surfactants

Colorants, waxes, and other additives used to form toner compositions may be in dispersions that include surfactants. Moreover, toner particles may be formed by emulsion aggregation methods where the resin and other components of the toner are placed in contact with one or more surfactants, an emulsion is formed, toner particles are aggregated, coalesced, optionally washed and dried, and recovered.

One, two, or more surfactants may be used. The surfactants may be selected from ionic surfactants and nonionic surfactants. Anionic surfactants and cationic surfactants are encompassed by the term "ionic surfactants." The surfactant may be present in an amount of from about 0.01 to about 5 wt % of the toner composition, such as from about 0.75 to about 4 wt % weight of the toner composition, or from about 1 to about 3 wt % of the toner composition.

Examples of suitable nonionic surfactants include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC PE/F, such as SYNPERONIC PE/F 108.

Suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be used.

Examples of cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, cetyl pyridinium bromide, benzalkonium chloride, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Waxes

The resin emulsion may be prepared to include a wax. In these embodiments, the emulsion will include resin and wax particles at the desired loading levels, which allows for a single resin and wax emulsion to be made rather than separate resin and wax emulsions. Further, the combined emulsion allows for reduction in the amount of surfactant needed to prepare separate emulsions for incorporation into toner compositions. This is particularly helpful in instances where it would otherwise be difficult to incorporate the wax into the emulsion. However, the wax can also be separately emulsified, such as with a resin, and separately incorporated into final products.

In addition to the polymer binder resin, the toners may also contain a wax, either a single type of wax or a mixture of two or more preferably different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes may be added to provide multiple properties to the toner composition.

Examples of suitable waxes include waxes selected from natural vegetable waxes, natural animal waxes, mineral waxes, synthetic waxes, and functionalized waxes. Natural vegetable waxes include, for example, carnauba wax, candelilla wax, rice wax, sumacs wax, jojoba oil, Japan wax, and bayberry wax. Examples of natural animal waxes include, for example, beeswax, punic wax, lanolin, lac wax, shellac wax, and spermaceti wax. Mineral-based waxes include, for example, paraffin wax, microcrystalline wax, montan wax, ozokerite wax, ceresin wax, petrolatum wax, and petroleum wax. Synthetic waxes include, for example, Fischer-Tropsch wax; acrylate wax; fatty acid amide wax; silicone wax; polytetrafluoroethylene wax; polyethylene wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, diglyceryl distearate, dipropyleneglycol distearate, and triglyceryl tetrastearate; sorbitan higher fatty acid ester waxes, such as sorbitan monostearate; and cholesterol higher fatty acid ester waxes, such as cholesteryl stearate; polypropylene wax; and mixtures thereof.

In some embodiments, the wax may be selected from polypropylenes and polyethylenes commercially available from Allied Chemical and Baker Petrolite (for example POLYWAX™ polyethylene waxes from Baker Petrolite), wax emulsions available from Michelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. The commercially available polyethylenes usually possess a molecular weight (Mw) of from about 500 to about 2,000, such as from about 1,000 to about 1,500, while the commercially available polypropylenes used have a molecular weight of from about 1,000 to about 10,000. Examples of functionalized waxes include amines, amides, imides, esters, quaternary amines, carboxylic acids or acrylic polymer emulsion, for example, JONCRYL 74, 89, 130, 537, and 538, all available from Johnson Diversey, Inc., and chlorinated polyethylenes and polypropylenes commercially available from Allied Chemical and Petrolite Corporation and Johnson Diversey, Inc. The polyethylene and polypropylene compositions may be selected from those illustrated in British Pat. No. 1,442,835, the entire disclosure of which is incorporated herein by reference.

The toners may contain the wax in any amount of from, for example, about 1 to about 25 wt % of the toner, such as from about 3 to about 15 wt % of the toner, on a dry basis; or from about 5 to about 20 wt % of the toner, or from about 5 to about 11 wt % of the toner.

Colorants

The toners may also contain at least one colorant. For example, colorants or pigments as used herein include pigment, dye, mixtures of pigment and dye, mixtures of pigments, mixtures of dyes, and the like. For simplicity, the term "colorant" as used herein is meant to encompass such colorants, dyes, pigments, and mixtures, unless specified as a particular pigment or other colorant component. The colorant may comprise a pigment, a dye, mixtures thereof, carbon black, magnetite, black, cyan, magenta, yellow, red, green, blue, brown, and mixtures thereof, in an amount of about 0.1 to about 35 wt % based upon the total weight of the composition, such as from about 1 to about 25 wt %, or from about 2 to about 15 wt %.

In general, suitable colorants include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD Red (Aldrich), Lithol Rubine Toner (Paul Uhlrich), Lithol Scarlet 4440, NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, ITT and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Petmanerit Yellow YE 0305 (Paul Uhlrich), Lumogen Yellow D0790 (BASF), Suco-Gelb 1250 (BASF), Suco-Yellow D1355 (BASF), Suco Fast Yellow D1165, D1355 and D1351 (BASF), Hostaperm Pink E (Hoechst), Fanal Pink D4830 (BASF), Cinquasia Magenta (DuPont), Paliogen Black L9984 9BASF), Pigment Black K801 (BASF), and carbon blacks such as REGAL 330 (Cabot), Carbon Black 5250 and 5750 (Columbian Chemicals), and the like, and mixtures thereof.

Additional colorants include pigments in water-based dispersions such as those commercially available from Sun Chemical, for example SUNSPERSE BHD 6011X (Blue 15 Type), SUNSPERSE BHD 9312X (Pigment Blue 15 74160), SUNSPERSE BHD 6000X (Pigment Blue 15:3 74160), SUNSPERSE GHD 9600X and GHD 6004X (Pigment Green 7 74260), SUNSPERSE QHD 6040X (Pigment Red 122 73915), SUNSPERSE RHD 9668X (Pigment Red 185 12516), SUNSPERSE RHD 9365X and 9504X (Pigment Red 57 15850:1, SUNSPERSE YHD 6005X (Pigment Yellow 83 21108), FLEXIVERSE YFD 4249 (Pigment Yellow 17 21105), SUNSPERSE YHD 6020X and 6045X (Pigment Yellow 74 11741), SUNSPERSE YHD 600X and 9604X (Pigment Yellow 14 21095), FLEXIVERSE LFD 4343 and LFD 9736 (Pigment Black 7 77226), and the like, and mixtures thereof. Other water based colorant dispersions include those commercially available from Clariant, for example, HOSTAFINE Yellow GR, HOSTAFINE Black T and Black TS, HOSTAFINE Blue B2G, HOSTAFINE Rubine F6B, and magenta dry pigment such as Toner Magenta 6BVP2213 and Toner Magenta EO2 that may be dispersed in water and/or surfactant prior to use.

Other colorants include, for example, magnetites, such as Mobay magnetites MO8029, MO8960; Columbian magnetites, MAPICO BLACKS and surface treated magnetites; Pfizer magnetites CB4799, CB5300, CB5600, MCX6369; Bayer magnetites, BAYFERROX 8600, 8610; Northern Pigments magnetites, NP-604, NP-608; Magnox magnetites TMB-100 or TMB-104; and the like, and mixtures thereof. Specific additional examples of pigments include phthalocyanine HELIOGEN BLUE L6900, D6840, D7080, D7020, PYLAM OIL BLUE, PYLAM OIL YELLOW, PIGMENT BLUE 1 available from Paul Uhlrich & Company, Inc., PIGMENT VIOLET 1, PIGMENT RED 48, LEMON CHROME YELLOW DCC 1026, E.D. TOLUIDINE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Examples of magentas include, for example, 2,9-dimethyl substituted quinacridone and anthraquinone dye identified in the Color Index as CI 60710, CI Dispersed Red 15, diazo dye identified in the Color Index as CI 26050, CI Solvent Red 19, and the like, and mixtures thereof. Illustrative examples of cyans include copper tetra (octadecyl sulfonamide) phthalocyanine, x-copper phthalocyanine pigment listed in the Color Index as CI74160, CI Pigment Blue, and Anthrathrene Blue identified in the Color Index as DI 69810, Special Blue X-2137, and the like, and mixtures thereof. Illustrative examples of yellows that may be selected include diarylide yellow 3,3-dichlorobenzidene acetoacetanilides, a monoazo pigment identified in the Color Index as CI-12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. Colored magnetites, such as mixtures of MAPICOBLACK and cyan components, may also be selected as pigments.

The colorant, such as carbon black, cyan, magenta, and/or yellow colorant, is incorporated in an amount sufficient to impart the desired color to the toner. In general, pigment or dye is employed in an amount ranging from about 1 to about 35 wt % of the toner particles on a solids basis, such as from about 5 to about 25 wt %, or from about 5 to about 15 wt %. However, amounts outside these ranges can also be used.

Coagulants

Coagulants used in emulsion aggregation processes for making toners include monovalent metal coagulants, divalent metal coagulants, polyion coagulants, and the like. As used herein, "polyion coagulant" refers to a coagulant that is a salt or an oxide, such as a metal salt or a metal oxide, formed from a metal species having a valence of at least 3, at least 4, or at least 5. Suitable coagulants include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, aluminum sulfate, and the like. Other suitable coagulants include tetraalkyl titivates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds may have from about 2 to about 13, such as from about 3 to about 8, or from about 4 to about 7 aluminum ions present in the compound.

The coagulants may be incorporated into the toner particles during particle aggregation. As such, the coagulant may be present in the toner particles, exclusive of external additives and on a dry weight basis, in amounts of from 0 to about 5 wt % of the toner particles, such as from about greater than 0 to about 3 wt %, or from about 0.5 to 2 wt % of the toner particles.

Emulsion Aggregation Procedures

Any suitable emulsion aggregation procedure may be used and modified in forming emulsion aggregation toner particles comprising the amorphous polyester resins disclosed herein, without restriction. These procedures typically include the basic process steps of mixing together an emulsion containing a polymer or a resin, optionally one or more waxes, optionally one or more colorants, optionally one or more surfactants, an optional coagulant, and one or more additional optional additives to form a slurry; heating the slurry to form aggregated particles in the slurry; freezing aggregation of the particles by adjusting the pH; and heating the aggregated particles in the slurry to coalesce the particles into toner particles; and then recovering, optionally washing, and optionally drying the obtained emulsion aggregation toner particles.

Emulsion Aggregation Toner Particles

The toner particles may have a circularity of about 0.920 to about 0.999, such as from about 0.940 to about 0.980, or from about 0.962 to about 0.980, or from about greater than or equal to 0.965 to about 0.990. A circularity of 1.000 indicates a completely circular sphere. Circularity may be measured with, for example, a Sysmex FPIA 2100 analyzer.

Emulsion aggregation processes provide greater control over the distribution of toner particle sizes and by limiting the amount of both fine and coarse toner particles in the toner. In some embodiments, the toner particles have a relatively narrow particle size distribution with a lower number ratio geometric standard deviation (GSDn) of about 1.15 to about 1.40, such as from about 1.15 to about 1.25, or from about 1.20 to about 1.35. The toner particles may also exhibit an upper geometric standard deviation by volume (GSDv) in the range of from about 1.15 to about 1.35, such as from about 1.15 to about 1.21, or from about 1.18 to about 1.30.

The toner particles may have a volume average diameter (also referred to as "volume average particle diameter" or "$D_{50v}$") of from about 3 to about 25 µm, such as from about 4 to about 15 µm, or from about 5 to about 12 µm.

$D_{50v}$, GSDv, and GSDn may be determined using a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

The toner particles may have a shape factor of from about 105 to about 170, such as from about 110 to about 160, or from about 115 to about 130 SF1*a. Scanning electron microscopy (SEM) may be used to determine the shape factor analysis of the toners by SEM and image analysis (IA). The average particle shapes are quantified by employing the following shape factor (SF1*a) formula: $SF1*a = 100\pi d^2/(4A)$, where A is the area of the particle and d is its major axis. A perfectly circular or spherical particle has a shape factor of exactly 100. The shape factor SF1*a increases as the shape becomes more irregular or elongated in shape with a higher surface area.

The characteristics of the toner particles may be determined by any suitable technique and apparatus and are not limited to the instruments and techniques indicated hereinabove.

The toner particles may have a weight average molecular weight (Mw) in the range of from about 2,500 to about 60,000 daltons, a number average molecular weight (Mn) of from about 1,500 to about 18,000 daltons, and an MWD (a ratio of the Mw to Mn of the toner particles, a measure of the polydispersity, or width, of the polymer) of from about 1.7 to about 10. For cyan and yellow toners, the toner particles can exhibit an Mw of from about 2,500 to about 45,000 daltons, an Mn of from about 1,500 to about 15,000 daltons, and a MWD of from about 1.7 to about 10. For black and magenta, the toner particles can exhibit an Mw of from about 2,500 to about 45,000 daltons, an Mn of from about 1,500 to about 15,000 daltons, and an MWD of from about 1.7 to about 10.

Further, the toners if desired can have a specified relationship between the molecular weight of the latex binder and the molecular weight of the toner particles obtained following the emulsion aggregation procedure. As understood in the art, the binder undergoes crosslinking during processing, and the extent of crosslinking can be controlled during the process. The relationship can best be seen with respect to the molecular peak values (Mp) for the binder, which represents the highest peak of the Mw. In the present disclosure, the binder can have Mp values in the range of from about 5,000 to about 30,000 daltons, such as from about 7,500 to about 29,000 daltons. The toner particles prepared from the binder also exhibit a high molecular peak, for example, of from about 5,000 to about 32,000, such as from about 7,500 to about 31,500 daltons, indicating that the molecular peak is driven by the properties of the binder rather than another component such as the colorant.

Toners produced in accordance with the present disclosure may possess excellent charging characteristics when exposed to extreme relative humidity (RH) conditions. The low-humidity zone (C zone) may be about 12° C./15% RH, while the high humidity zone (A zone) may be about 28° C./85% RH. Toners of the present disclosure may possess a parent toner charge per mass ratio (Q/M) of from about −2 μC/g to about −50 μC/g, such as from about −4 μC/g to about −35 μC/g, and a final toner charging after surface additive blending of from −8 μC/g to about −40 μC/g, such as from about −10 μC/g to about −25 μC/g.

The toners may exhibit a heat cohesion at 54° C. of, for example, from about 0% to about 60%, such as from about 5% to about 20%, or from about 0% to about 10%, or at about 5%. The toners may exhibit a heat cohesion at 55° C. of, for example, from about 0% to about 80%, such as from about 5% to about 20%, or from about 0% to about 60%, or about 8%. The toners may exhibit a heat cohesion at 56° C. of, for example, from about 0% to about 90%, such as from about 5% to about 30%, or from about 0% to about 70%, or about 20%.

The toners may exhibit a cold offset temperature of, for example, from about 100° C. to about 140° C., such as from about 110° C. to about 130° C., or from about 115° C. to about 120° C.

The toner compositions may have a gloss, measured at the minimum fixing temperature (MFT), of from about 10 to about 50 gloss units, such as from about 20 to about 40 gloss units, or from about 25 to about 35 gloss units as measured on a BYK 75 degree micro gloss meter. "Gloss units" refers to Gardner Gloss Units (ggu) measured on plain paper (such as Xerox 90 gsm COLOR XPRESSIONS+ paper or Xerox 4024 paper). The toners may reach 40 gloss units (TG40) at a temperature of, for example, from about 170° C. to about 210° C., such as from about 180° C. to about 200° C., or from about 185° C. to about 195° C. The toners may have a peak gloss of, for example, from about 40 ggu to about 75 ggu, such as from about 50 ggu to about 70 ggu, or from about 55 ggu to about 65 ggu.

Crease fix MFT is measured by folding images that have been fused over a wide range of fusing temperatures and then rolling a defined mass across the folded area. The print can also be folded using a commercially available folder such as the Duplo D-590 paper folder. The sheets of paper are then unfolded and toner that has been fractured from the sheet of paper is wiped from the surface. Comparison of the fractured area is then made to an internal reference chart. Smaller fractured areas indicate better toner adhesion and the temperature required to achieve acceptable adhesion is defined as the crease fix MFT. The toner compositions may have a crease fix MFT of, for example, from about 115° C. to about 145° C., such as from about 120° C. to about 140° C., or from about 125° C. to about 135° C.

EXAMPLES

Example I

Preparation of Resin 1

Into a 3-neck round bottom flask fitted with a paddle stirrer, a thermocouple, and a Dean Stark attached to a water cooled condenser, were added 83 grams of 70% purity abietic acid (275 mmol; 1.0 equivalent weight), 25.3 grams of 99.5% glycerol (275 mmol; 1.0 equivalent weight), and 0.201 grams Fascat 4100 catalyst. The contents of the flask were heated with stirring under nitrogen. The temperature was gradually increased to 225° C. and held there for 4 to 5 hours. Once the esterified product was formed, 13.9 grams of sebacic acid (68.8 mmol; 0.15 equivalent weight), 19.04 grams of isophthalic acid (115 mmol; 0.25 equivalent weight), and 0.191 grams Fascat 4100 catalyst was added to flask and heating at 220° C. continued for 14 hours until the softening point (Ts) of the resin reached 115.7° C. The Ts of the resin was determined by the Mettler FP800 Thermosystem consisting of a FP80 Central Processor and a FP83 Dropping Cell. The temperature was programmed to increase at 1° C./min until the target Ts was reached.

After the polymer resin cooled to room temperature, the polymer was broken into small chunks with a chisel and a small portion was ground in a M20 IKA Werke mill. The ground polymer was analyzed for molecular weight by gel permeation chromatography (GPC), glass transition temperature (Tg) by differential scanning calorimetry (DSC), and viscosity by AR-2000 Rheometric Scientific rheometer. The acid value (or "neutralization number" or "acid number" or "acidity") was measured by dissolving a known amount of polymer sample in organic solvent and titrating with a solution of potassium hydroxide with known concentration and with phenolphthalein as a color indicator. Acid number is the mass of potassium hydroxide (KOH) in milligrams that is required to neutralize one gram of chemical substance. In this case, the acid number was the measure of the amount of carboxylic acid groups in the polyester molecule.

Example II

Preparation of Resin 2

Into a 3-neck round bottom flask fitted with a paddle stirrer, a thermocouple and a Dean Stark attached to a water cooled condenser, were added 83 grams of 70% purity abietic acid (275 mmol; 1.0 equivalent weight), 25.3 grams of 99.5% glycerol (275 mmol; 1.0 equivalent weight), and 0.201 grams Fascat 4100 catalyst. The contents of the flask were heated with stirring under nitrogen. The temperature was gradually increased to 225° C. and held there for 10 to 13 hours. Once the esterified product was formed, 13.9 grams of sebacic acid (68.8 mmol; 0.15 equivalent weight), 19.04 grams of isophthalic acid (115 mmol; 0.25 equivalent weight), and 0.191 grams Fascat 4100 catalyst were added to the flask and heating at 220° C. continued for 14 hours until the Ts of the resin reached 121.6° C. The Ts of the resin was determined by the Mettler FP800 Thermosystem consisting of FP80 Central Processor and FP83 Dropping Cell. The temperature was programmed to increase at 1° C./min until the target Ts was reached.

After the polymer resin cooled to room temperature, the polymer was broken into small chunks with a chisel and a small portion was ground in a M20 IKA Werke mill. The ground polymer sample was analyzed via GPC, DSC, rheology, and acid value.

Example III

Preparation of a Toner Using Resin 1

Into a 2 liter glass reactor equipped with an overhead mixer were added 133.87 g of resin 1 emulsion (18.65 wt %), 32.65 g crystalline resin emulsion (35.17 wt %), 18.76 g IGI wax dispersion (30.98 wt %), and 21.95 g cyan pigment PB15:3 (17.21 wt %). Separately 0.54 g $Al_2(SO_4)_3$ (27.85 wt %) was added in as the flocculent under homogenization. The mixture was heated to 39.3° C. to aggregate the particles while stirring at 300 rpm. The particle size was monitored with a Coulter Counter until the core particles reached a volume average particle size of 4.94 mm with a GSD volume of 1.25, and then 94.58 g of resin 1 emulsion was added as shell material, resulting in a core-shell structured particles with an average particle size of 5.60 µm, GSD volume 1.23. Thereafter, the pH of the reaction slurry was increased to 8.45 using 4 wt % NaOH solution followed by 1.16 g Versene 100 (EDTA, 39 wt %) to freeze the toner growth. After freezing, the reaction mixture was heated to 78° C., and pH was reduced to 7.65 using pH 5.7 acetic acid/sodium acetate (HAc/NaAc) buffer solution for coalescence. The toner was quenched after coalescence, resulting in a final particle size of 5.96 µm, GSD volume of 1.29, and GSD number 1.41. The toner slurry was then cooled to room temperature, separated by sieving (25 mm), filtration, followed by washing and freeze dried.

Results

In Example 1, the first step of the polymerization results in the synthesis of (1R,4aR,4bR)-2,3-dihydroxypropyl 7-isopropyl-1,4a-dimethyl-1,2,3,4,4a,4b,5,6,10,10a-decahydrophenanthrene-1-carboxylate or abietic-glycerol diol macromer. Analytical results of this reaction are seen in Table 1 below.

TABLE 1

| AV | Mw | Mn | PDI | Tg(on) | Tg(mid) | Tg(off) |
|---|---|---|---|---|---|---|
| 17.2 | 1513 | 1436 | 1.05 | 37.0 | 42.0 | 47.1 |

The results show that the acid value (AV) of the macromer is high for a dial, which is due to the 30% impurities found in abietic acid, such as diacids or other less reactive monoacids. Regardless, the purity of abietic acid does not hinder or effect the quality of the final polymer product. In one study, it was found that the crude tall oil, fatty acid, and rosin acid products were mixtures of multiple peaks when analyzed via gas chromatography. The two predominate rosin acids were abietic and dehydroabietic acid. Oleic, linoleic, palmitic, and stearic acids were the major fatty acids, with oleic acid and linoleic acid being prevalent. Minor rosin components (isopimaric, pimaric, and neoabietic acid) were identified through the use of the Wiley mass-spectral library of the GC-MS (Taylor et al., J. Chromatogr. Sci. 39, 270-272 (2001), the disclosure of which is herein incorporated by reference in its entirety). The presence of bulky groups near the carboxylic acid group of the rosin acids inhibits the transesterification because the molecular activity between the carboxylic acid and hydroxyl follows the order of primary>secondary>tertiary acids, which would then result in the free acid groups analyzed via titration.

The second step of the polymerization results in a polymeric material having very similar properties to two BPA-containing resins produced by known methods (BPA resins 1 and 2). The polydispersity of resins 1 and 2 are wider BPA resins 1 and 2 due to the shorter chain population of the polymers (a result of abietic acid purity). However, the wide polydispersity has no impact on resin characteristics or rheology. Resin 2 was reacted for a longer period of time than resin 1 in the first step, which resulted in some minimal crosslinking. Despite the crosslinking, resin 2 was still 100% dissolvable in tetrahydrofuran (THF) with no gellation present. Overall, the rheology of resins 1 and 2 exhibit a good transition of viscosity from low to high temperatures, which are characteristic for amorphous resins for BA toner.

Table 2 below summarizes experimental formulations and properties of resins 1 and 2 compared to BPA resins 1 and 2.

TABLE 2

| Resin ID | Monomers (mol/eq) | | | Bio-content | Ts (° C.) | Tg$_{(on)}$ (° C.) | AV | Mn | Mw |
|---|---|---|---|---|---|---|---|---|---|
| | Rosin acid-glycerol Macromer | Sebacic acid (eq) | iPA (eq) | | | | | | |
| Resin 1 | 0.60 | 0.15 | 0.25 | 86.1% | 115.7 | 55.3 | 14.5 | 1755 | 29888 |
| Resin 2 | 0.60 | 0.15 | 0.25 | 86.1% | 121.6 | 53.7 | 8.4 | 1300 | 26718 |
| BPA resin 1 | n/a | | | 0% | 129.0 | 55.2 | 12.7 | 5600 | 53300 |
| BPA resin 2 | n/a | | | 0% | 118.0 | 58.8 | 14.7 | 5000 | 19400 |

*iPA = isophthalic acid

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of making a bio-based polyester resin, the method comprising:
    a) obtaining a bio-based glycerol that is a transesterification product of crude vegetable oil;
    b) obtaining a bio-based abietic acid;
    c) performing an esterification reaction between the bio-based glycerol and the bio-based abietic acid to form a 100% bio-based abietic acid-glycerol macromere, wherein the esterification comprises heating for at least 4 hours; and
    d) polycondensing the macromer with at least two diacids in the presence of a catalyst to obtain the bio-based polyester resin;

wherein the bio-based polyester resin is at least 80 mol % bio-based and comprises,
i) a softening point of about 90° C. to about 150° C., and
ii) an acid value of about 8 to about 16 mgKOH/g.

2. The method of claim 1, wherein:
a first diacid of the at least two diacids is sebacic acid; and
a second diacid of the at least two diacids is either isophthalic acid or succinic acid.

3. The method of claim 1, wherein at least one of the at least two diacids is selected from the group consisting of sebacic acid, succinic acid, isophthalic acid, adipic acid, azelaic acid, and glutaric acid.

4. The method of claim 1, wherein the ratio of the macromer in the polyester resin is from about 40 to about 60 mol % of the polyester resin.

5. The method of claim 1, wherein the polyester resin has a glass transition temperature of from about 45° C. to about 75° C.

6. The method of claim 1, wherein the polyester resin has a softening point temperature of from about 115° C. to about 122° C.

7. The method of claim 1, wherein the polyester resin has an acid value of about 8 or about 15 mgKOH/g.

8. A method of forming toner particles comprising a bio-based polyester resin, the method comprising:
A) forming a slurry by mixing together:
  a) an emulsion containing the bio-based polyester resin obtained from a method comprising:
    i) obtaining a bio-based glycerol that is a transesterification product of crude vegetable oil;
    ii) obtaining a bio-based abietic acid;
    iii) performing an esterification reaction between the bio-based glycerol and the bio-based abietic acid to form a 100% bio-based abietic acid-glycerol macromer, wherein the esterification comprises heating for at least 4 hours; and
    iv) polycondensing the macromer with at least two diacids in the presence of a catalyst to obtain the bio-based polyester resin, wherein the bio-based polyester resin is at least 80 mol % bio-based and comprises a softening point of about 90° C. to about 150° C., and an acid value of about 8 to about 16 mgKOH/g;
  b) optionally a wax;
  c) optionally a colorant;
  d) optionally a surfactant;
  e) optional a coagulant; and
  f) one or more additional optional additives;
B) heating the slurry to form aggregated particles in the slurry;
C) freezing aggregation of the particles by adjusting the pH; and
D) heating the aggregated particles in the slurry to coalesce the particles into toner particles, thereby forming toner particles comprising a bio-based polyester resin.

9. The method of claim 8, wherein:
a first diacid of the at least two diacids is sebacic acid; and
a second diacid of the at least two diacids is either isophthalic acid or succinic acid.

10. The method of claim 8, wherein at least one of the at least two diacids is selected from the group consisting of sebacic acid, succinic acid, isophthalic acid, adipic acid, azelaic acid, and glutaric acid.

11. The method of claim 8, wherein the ratio of the macromer in the polyester resin is from about 5 to 95 mol % of the polyester resin.

12. The method of claim 8, wherein the toner particles have a circularity of from about 0.920 to about 0.999.

13. The method of claim 8, wherein the toner particles have a volume average particle diameter of from about 3 to about 25 um.

14. The method of claim 1, wherein the bio-based polyester resin comprises the at least two diacids in a total amount of from about 40 to about 60 mol % of the bio-based polyester resin.

15. The method of claim 8, wherein the bio-based polyester resin comprises the at least two diacids in a total amount of from about 40 to about 60 mol % of the bio-based polyester resin.

* * * * *